US010324259B2

(12) United States Patent
Huang (10) Patent No.: US 10,324,259 B2
(45) Date of Patent: Jun. 18, 2019

(54) METHOD OF SPLICING OPTICAL FIBERS AND APPARATUS THEREOF

(71) Applicant: Yong Huang, Milpitas, CA (US)

(72) Inventor: Yong Huang, Milpitas, CA (US)

(73) Assignee: Comcore Optical Intelligence Technologies Co., Ltd., Pudong, Shanghai (CN)

( * ) Notice: Subject to any disclaimer, the term of this patent is extended or adjusted under 35 U.S.C. 154(b) by 0 days.

(21) Appl. No.: 16/350,411

(22) Filed: Nov. 13, 2018

(65) Prior Publication Data

US 2019/0086613 A1 Mar. 21, 2019

Related U.S. Application Data

(62) Division of application No. 15/732,440, filed on Nov. 13, 2017, now Pat. No. 10,168,480.

(30) Foreign Application Priority Data

Apr. 14, 2017 (CN) .......................... 2017 1 0242945

(51) Int. Cl.
*G02B 6/255* (2006.01)
*G02B 6/25* (2006.01)

(52) U.S. Cl.
CPC .............. *G02B 6/2555* (2013.01); *G02B 6/25* (2013.01); *G02B 6/2553* (2013.01); *G02B 6/2551* (2013.01)

(58) Field of Classification Search
CPC ....... G02B 6/25; G02B 6/2553; G02B 6/2555
See application file for complete search history.

(56) References Cited

U.S. PATENT DOCUMENTS

| 5,611,015 A | * | 3/1997 | Tokumaru ............ G01M 11/088 385/98 |
| 6,478,481 B2 | * | 11/2002 | Uchida ................ G02B 6/2551 385/135 |
| 7,467,899 B2 | * | 12/2008 | Akiyama ............. G02B 6/2558 385/135 |
| 7,860,364 B2 | * | 12/2010 | Mullaney ............. G02B 6/4498 385/134 |
| 10,168,480 B2 | * | 1/2019 | Huang ................. G02B 6/2555 |
| 2002/0009271 A1 | * | 1/2002 | Herve ................. G02B 6/2551 385/98 |

FOREIGN PATENT DOCUMENTS

| JP | 06109946 A | * | 4/1994 | ............. G02B 6/255 |
| JP | 09005563 A | * | 1/1997 | ............. G02B 6/287 |
| JP | 2002286964 A | * | 10/2002 | ............. G02B 6/255 |

* cited by examiner

*Primary Examiner* — Daniel Petkovsek (57) ABSTRACT

Embodiments of present invention provide a method of splicing optical fibers. The method includes holding a first and a second fiber respectively by a first and a second rotary clamp; aligning axes of the first and second fibers to a common reference; moving the first and second fibers that are being held by the first and second rotary clamps onto a splicing machine; and causing the first and second fibers being spliced together by the splicing machine. A fiber splicing apparatus or system is also provided for performing the method thereof.

20 Claims, 6 Drawing Sheets

METHOD OF SPLICING OPTICAL FIBERS AND APPARATUS THEREOF

CROSS REFERENCE TO RELATED APPLICATION

The present application is a divisional application of U.S. patent application Ser. No. 15/732,440 filed Nov. 13, 2017, now issued as U.S. Pat. No. 10,168,480, which claims benefit of priority to a Chinese patent application S/N: 201710242945.8 filed Apr. 14, 2017, the content of which are incorporated herein by reference in its entirety.

FIELD OF THE INVENTION

The present application relates generally to method of splicing optical fibers as well as system for performing the same. In particular it relates to a fiber splicing system or apparatus that is adapted to splice regular fibers, linear polarization maintaining (PM) fibers, elliptical PM fibers, and other specialty fibers, as well as method of operating the same.

BACKGROUND

Optical fiber splicing machines are important apparatus and tools used in the process of manufacturing of equipment that are frequently found in fiber communication, fiber sensing, and fiber lasers, to name a few. Currently, there are two types of splicing machines available in the market: a first one that is relatively low cost but only suitable for splicing regular fibers, and a second one that is adapted for splicing linear polarization maintaining (PM) fibers in additional to regular fibers. Here and throughout this application, the term "regular fiber" refers to any fiber whose axis cross-section has circular symmetry with no particular axis orientation difference.

Splicing machines that are suitable only for regular fibers have thus far found their relatively high market demand and are widely used. Thanks to its low technical entry level, there are more than a dozen companies presently being able to manufacture and offer this type of splicing machines. On the other hand, there is a very limited and small number of companies in the world that are currently capable of manufacturing splicing machines suitable for handling linear PM fibers. Not only there is high equipment cost associated with the purchasing of these types of "special" splicing machines, which may be priced at tens to hundreds of thousand dollars, it is also known to be very costly to perform daily maintenance of these types of splicing machines that are made for handling linear PM fibers.

The low availability and high cost associated with splicing machine capable of handling linear PM fibers may be attributed, at least partially, to its high technical entry level due to, for example, difficulty in optical side-imaging processing and developing and lack of understanding of algorithm of mathematical computation in supporting the imaging processing. Moreover, the design concept of current splicing machines (for handling liner PM fibers) relies on integrating all of the required components and parts associated with the splicing process into an extremely compact mechanical structure in a precise manner, which makes it all too difficult to achieve a good compromise among cost, precision, and ease of handling. Moreover, the relatively low market demand, compared with those that are suitable only for regular fibers, also contributed to the slow progress of development of an affordable and yet reliable splicing machine that may splice PM fibers with high performance.

Nevertheless, even those splicing machines that are available in the market still have their unique limitations. For example, most of these splicing machines can only handle regular PM fibers which are mainly linear PM fibers, but will not be able to handle, or will fail to handle, tens of other types of specialty fibers currently available and being used in the fiber industry. Using the available splicing machine to handle specialty fibers or, for example, to splice different types of fibers together may often lead to misalignment between axes of the spliced fibers, which consequently results in high insertion loss at the splicing point and breakage thereof in a worst scenario, creating high re-work rate and slowing down of manufacture production cycle. This is because with specialty fibers such as, for example, elliptical PM fibers whose cross-sectional structure varies along the length of fiber, different from that of a linear PM fiber, the algorithm commonly used in the computation and imaging processing of currently available splicing machines simply does not apply and may therefore produce false results.

SUMMARY

A fiber splicing apparatus or system and method of performing the splicing is provided which provides ease of operation, high reliability, and low cost of operating and maintenance. More specifically, embodiments of present invention provide an optical fiber splicing system which includes a first and a second rotary clamp for holding two fibers to be spliced; an end-face alignment unit for assisting alignment of the two fibers; and a splicing machine for causing the two fibers to be spliced together, wherein the first and second rotary clamps are mounted onto the splicing machine after axes of the two fibers held by the first and second rotary clamps are respectively aligned to a common reference using the end-face alignment unit.

According to one embodiment, each of the first and second rotary clamps has a base member and a clamping member, and wherein the clamping member is adjustable in a rotational movement, relative to the base member, for axis orientation alignment of the two fibers. In one embodiment, the base member includes a locking mechanism for locking the rotational movement of the clamping member.

According to another embodiment, the base member includes a slit for passing the fiber onto the clamping member, and the clamping member includes a pressing sheet for holding the fiber tight through pressing, and a rotational knob that has a channel at a center thereof for accommodating the fiber during the rotational movement of the clamping member.

According to yet another embodiment, the end-face alignment unit has a special sitting arrangement with the base member of the first and second rotary clamps, and a microscope to display an end-face of the fiber during alignment of axis orientation of the fiber, wherein the microscope displays in a viewfinder one or more mesh-type grid lines that includes the common reference.

According to a further embodiment, the splicing machine is adapted to host the base member of the first and second rotary clamps through a special sitting arrangement thereby maintaining an axis orientation relationship between the two fibers that are aligned to the common reference by the end-face alignment unit.

The optical fiber splicing system may further include a fiber cutter that is capable of cutting the two fibers to prepare end-faces thereof for splicing.

Embodiments of present invention further provide a method of splicing optical fibers. The method includes holding a first and a second fiber respectively by a first and a second rotary clamp; aligning axes of the first fiber to axis of the second fibers through a common reference; moving the first and second fibers that are being held by the first and second rotary clamps onto a splicing machine while maintaining axis orientation alignment between the first and second fibers; and causing the first and second fibers being spliced together by the splicing machine.

In one embodiment, each of the first and second rotary clamps has a base member and a clamping member that is rotationally adjustable relative to the base member and the first and second fibers are held by the clamping members of the first and second rotary clamps respectively. In another embodiment, the method includes applying a special sitting arrangement among the rotary clamps and the splicing machine to substantially maintain axis orientation relationship between the first and second fibers.

BRIEF DESCRIPTION OF THE DRAWINGS

The present invention will be understood and appreciated more fully from the following detailed description of embodiments of the invention, taken in conjunction with accompanying drawings of which.

It will be appreciated that for simplicity and clarity purpose, elements shown in the drawings have not necessarily been drawn to scale. Further, in various functional block diagrams, two connected devices and/or elements may not necessarily be illustrated to be connected. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

Figure 1:
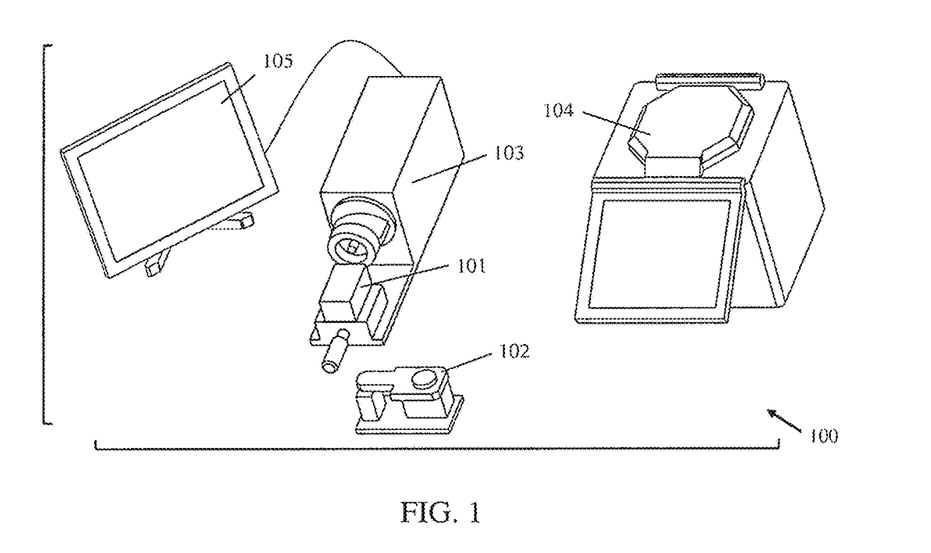
FIG. 1 is a demonstrative illustration of a fiber splicing apparatus or system according to an embodiment of present invention.

FIG. 1 is a demonstrative illustration of a fiber splicing apparatus or system according to an embodiment of present invention. In particular, as being illustrated in FIG. 1, fiber splicing apparatus 100, or system 100 as it may be referred to as well from time to time throughout this application, may have various components including two rotary clamps 101 (although only one is illustrated here for simplicity) or rotary clamping means or fiber holding members as they may be referred to as well, a fiber cutter 102, an end-face alignment unit 103, and a splicing machine 104 or splicer. The end-face alignment (EFA) unit 103 may additionally include a viewfinder 105 that may be, for example, a display screen and may be used by a user to observe and thereby adjust axis orientation of end-face of fibers during alignment at a preparation stage when the user is performing splicing of the fibers. Hereinafter, whenever the term "axis" of fiber is concerned such as its orientation, adjustment, alignment, or rotation, it refers to an axis of the fiber within a cross-section of the fiber. For example, when a polarization maintaining (PM) fiber is concerned, the axis could be the slow axis or fast axis of the PM fiber.

In FIG. 1, the rotary clamp 101, or rotary clamping means or fiber holding member, is illustrated as being mounted onto or held by the end-face alignment unit 103. The mounting or holding may be made via a special sitting arrangement between the two components of the fiber splicing apparatus 100 for precision control, according to an embodiment of present invention. As being described below in more details with reference to FIGS. 3(a) and 3(b), the sitting arrangement may be, for example, pairs of matching grooves and ridges, pairs of magnets, holding stakes, and/or other physical feature structures that may hold one component in a relative position to the other component in a sufficiently precise and stable manner.

The same rotary clamp 101, together or separately with a second rotary clamp, may be mounted onto the splicing machine 104, or splicing means or splicer, through a similar precision control sitting arrangement made between the two components according to another embodiment of present invention, during or at a fiber splicing stage and/or a fiber end-face pre-cleaning stage. It is to be noted here that rotary clamp 101 may have been simplistically illustrated in FIG. 1 without detailed features, which are illustratively shown in FIG. 2 as rotary clamp 200. FIG. 1 is used to illustrate that the rotary clamp 101, which operates under a same or similar operational principle as that of rotary clamp 200 in FIG. 2, may be implemented in different physical shapes and/or forms without deviation from the spirit of present invention.

The fiber cutter 102 may be a stand-alone fiber cutter or may be made to work together with the rotary clamp 101 in preparation of end-faces of fibers before they are spliced. The fiber cutter 102 may optionally include a special sitting arrangement as well to accommodate or host rotary clamp 101 during use thereof.

Figure 2:
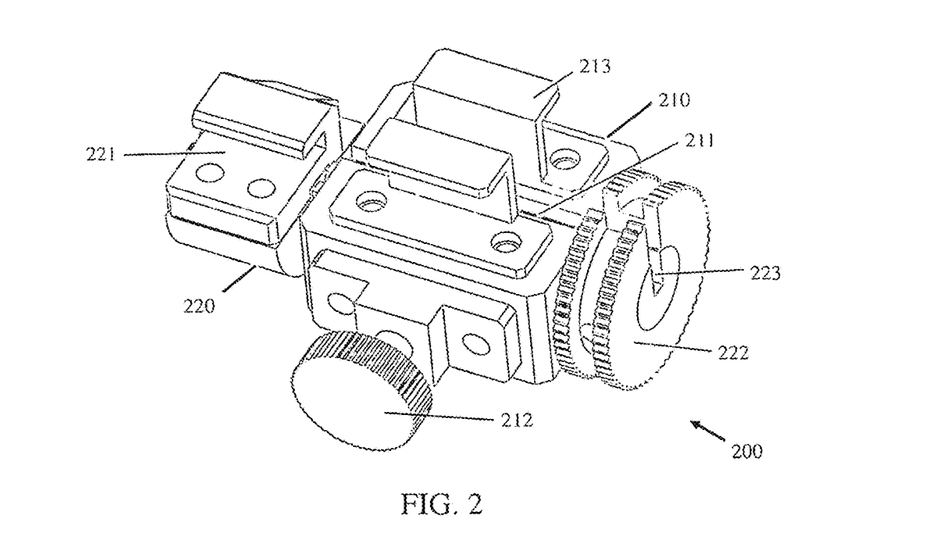
FIG. 2 is a demonstrative illustration of a sample rotary clamp used in the fiber splicing apparatus or system illustrated in FIG. 1 according to an embodiment of present invention.

FIG. 2 is a demonstrative illustration of a sample rotary clamp used in the fiber splicing apparatus or system 100 illustrated in FIG. 1 according to an embodiment of present invention. More specifically, as being illustrated in FIG. 2, the rotary clamp 200, or rotary clamping means or fiber holding member, may include at least a base member 210 and a clamping member 220 that is made or machined to be rotationally and/or axially adjustable relative to the base member 210.

In one embodiment, the base member 210 may include a groove 211, or a slit, that allows a fiber to pass through and reach a fiber-holding channel 223 made in the clamping member 220, a locking mechanism 212, or locking knob, that may be used to lock rotational movement of the clamping member 220 after axis orientation adjustment of the fiber held thereby, as being described below in more details, and a hand holder 213 that may be used for the ease of holding and transporting the rotary clamp 200. In another embodiment, the clamping member 220 may include a pressing sheet 221, or pressing member, that may press down on a fiber held by the channel 223 to hold the fiber tight during axis rotational adjustment and splicing of the fiber, for example, and a rotational dial 222, or rotational knob, that provides adjustment mechanism for rotational movement of the clamping member 220. The fiber-holding channel 223 may be made proximate to a center of the rotational dial 222, and along a rotational axis of the clamping member 220, to accommodate a free pass-through of the fiber that is placed inside the channel 223 and held by the pressing sheet 221. The clamping member 220 may be mated with and thus fit snug in the base member 210. It is to be noted here that embodiment of present invention are not limited in above aspects, and other embodiment of the base member 210 and the clamping member 220 are possible and they are fully contemplated herewith according to the spirit of present invention.

According to one embodiment, in a process of splicing two fibers together, a first optical fiber may be placed onto and held by a first rotary clamp 200, which could be a rotary clamping means or a fiber holding member. More specifically, a distal portion of the first optical fiber may be placed along the fiber-holding channel 223 of clamping member 220, through slit 211 of the base member 210, with the end thereof protruding the clamping member 220 (to the left in FIG. 2). The fiber is then held tight by pressing sheet 221 of the clamping member 220. The portion of fiber protruding the clamping member 220 may be made long enough for subsequent processing including for example cutting, pre-cleaning, and/or splicing. The remaining portion of the first optical fiber may be placed and go through channel 223 which is made sufficiently wide to accommodate the fiber such that knob 222 may rotationally and/or axially move freely without causing twist of the fiber.

The first optical fiber may be a bare fiber with its protective jacket and/or coating being stripped off, at least at the distal portion thereof, through either a chemical or mechanical means. In one embodiment, the fiber may be cut first by the fiber cutter 102 to have its end-face exposed before being placed onto and held by the rotary clamp 200. In another embodiment, the fiber cutter 102 may be used to prepare end-face of the fiber while the fiber is already held by the rotary clamp 200. In yet another embodiment, the fiber cutter 102 may be made to have a special sitting arrangement, referring to FIGS. 3(a) and 3(b) for more details, with rotary clamp 200 such that when the rotary clamp 200 is mounted or placed onto the fiber cutter 102 (or in a different embodiment when the fiber cutter 102 is mounted onto the rotary clamp 200, depending on the sitting arrangement), fiber cutter 102 may be able to maintain a fixed and stable position relative to the clamping member 220 thereby providing consistent end-face preparation of the fiber. To prepare an end-face of the fiber, the fiber cutter 102 may be pressed gently against the bare fiber to first create a cleavage or scar along a section of perimeter of the fiber, in a direction generally perpendicular to a longitudinal direction of the fiber. The fiber may then be gently bended to break along the cleavage or scar thereby creating an end-face at the cleavage point.

During performing splicing of two optical fibers, embodiment of present invention may include preparing a second optical fiber, which is to be spliced together with the first optical fiber, in a way similar to that of the first optical fiber as being described above. The second optical fiber may be held by a second rotary clamp, and may or may not be the same type of fiber as the first optical fiber.

Next, end-faces of the first and second optical fibers may be optionally cleaned. The end-faces are generally cleaned in order to improve the quality of splicing and reduce splicing related insertion losses to passing optical signals. To clean the end-faces of the fibers, the two rotary clamps 200 holding the two fibers may be mounted onto the splicing machine 104, individually or together. The splicing machine 104 may then be caused to generate an electric arcing to the proximity of the end-faces of the fibers, resulting in material residual at the tip or end-faces of the fibers being burned off or removed, together with any dirt or oily element that may affect a subsequent splicing process. Other method of cleaning may be used as well such as, for example, chemical solution may be used to wipe clean the exposed end-faces of the fibers.

Once the end-faces are cleaned, the first and second optical fibers are ready to be spliced together. In most cases, in particular when two polarization maintaining (PM) fibers are being spliced together, axis orientation of the two PM fibers need to be first aligned within a certain angular range, such as within 1.5~2.0 angular degrees, so as to achieve an acceptable extinction ratio, generally greater than 29 dB such as between 29.1~31.6 dB, between two polarizing lights that propagate inside the fiber.

The fiber splicing apparatus or system 100, according to one embodiment of present invention, includes the end-face alignment (EFA) unit 103 and a pair of rotary clamps 101 (such as rotary clamp 200 illustrated in FIG. 2) that may be used to align axis orientation of the first and second fibers. Using the EFA unit 103, the axis of the first and second fibers may first be aligned to a common reference in the EFA unit 103 and locked, more details of which are provided below with reference to FIGS. 4(a) and 4(b). When the two rotary clamps, holding the first and second fibers respectively, are removed from the EFA unit 103 and mounted onto the splicing machine 104, the axis orientation alignment or relationship of the first and second fibers relative to the EFA unit 103 may be maintained, by the locking mechanism 212, which, with the help of special sitting arrangement among the components, consequently results in a desired alignment between cross-sectional axes of the first and second fibers, ensuring a low insertion loss and high quality splicing by the splicing machine 104.

Figure 3A:
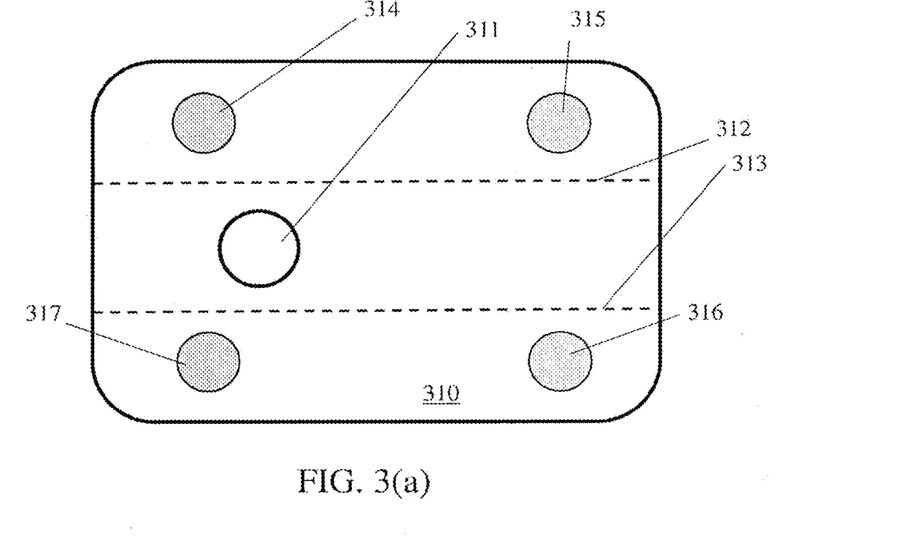
FIGS. 3(a) and 3(b) are demonstrative illustrations of special sitting arrangement among various components of the fiber splicing apparatus or system illustrated in FIG. 1 according to some embodiment of present invention.
Figure 3B:
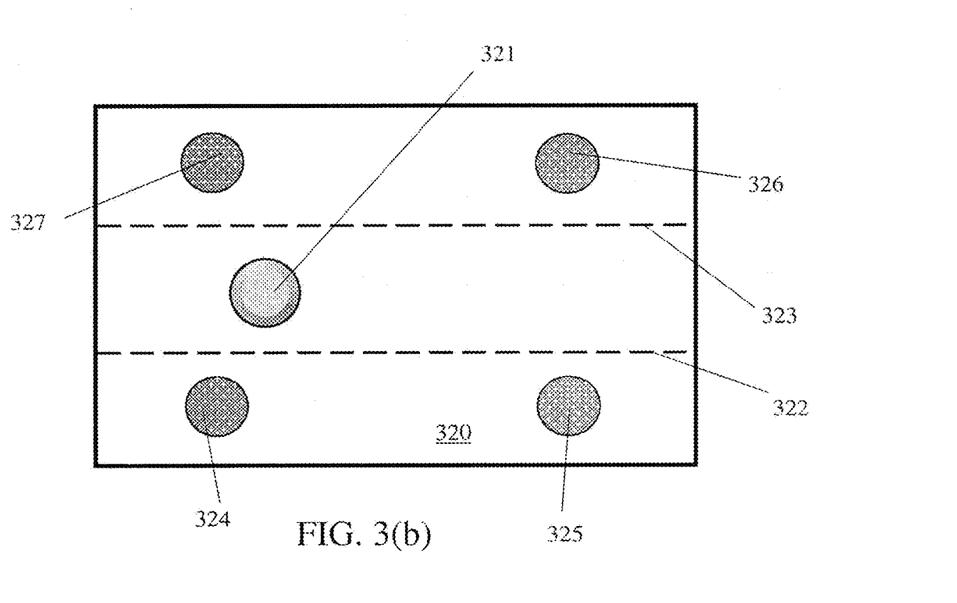

FIGS. 3(a) and 3(b) are demonstrative illustrations of special sitting arrangement among various components of the fiber splicing apparatus or system illustrated in FIG. 1 according to some embodiment of present invention. For example, special sitting arrangement between the rotary clamp 101 and the EFA unit 103, and between the rotary clamp 101 and the splicing machine 104 may be made such that axis orientation alignment or relationship of the two fibers made relative to a common reference in the EFA unit 103, thereby relative between the fibers, may be maintained when the rotary clamps holding the two fibers are moved from the EFA unit 103 onto the splicing machine 104.

In one embodiment, FIG. 3(a) may demonstratively illustrate a sitting arrangement 310 at a bottom surface of the base member 210 of the rotary clamp 200. The sitting arrangement may include, for example, a hole or void 311, a pair of grooves (or ridges) 312 and 313, and/or a set of magnets 314, 315, 316, and 317. Correspondingly, a hosting surface at the EFA unit 103, the splicing machine 104, and/or the fiber cutter 102, may include another sitting arrangement 320 that is made to match sitting arrangement 310. For example, in one embodiment, sitting arrangement 320 may include a stake or post 321, comparable in size and shape and made to mate with hole or void 311 of sitting arrangement 310, a pair of ridges (or grooves) 322 and 323 made to mate with grooves (or ridges) 312 and 313, and a set of magnets 324, 325, 326, and 327, of polarity opposing to that of magnets 314, 315, 316, and 317, such that they mate with each other. In another embodiment, 324, 325, 326, and 327 (or 314, 315, 316, and 317) may simply be a set of metal elements that work together with the corresponding magnets of the sitting arrangement 310 (or the sitting arrangement 320).

When rotary clamp 200 that has a sitting arrangement 310, e.g., at a bottom surface of the base member 210 is mounted onto the EFA unit 103 that has a top hosting surface of a sitting arrangement 320, e.g., the pair of features 311 and 321 may decide the exact position of rotary clamp 200 relative to the EPA unit 103. On the other hand, features 312 and 313, in pair with features 322 and 323, may determine an angular orientation of the rotary clamp 200 relative to the EFA unit 103. In the meantime, feature pairs of 314/324, 315/325, 316/326, and 317/327, through their magnetic force, may hold rotary clamp 200 together tightly with the EFA unit 103. The same may be achieved between the rotary clamp 200 and the splicing machine 104 when a hosting surface of the splicing machine 104 includes sitting arrangement 320 corresponding to sitting arrangement 310 found at the bottom of the rotary clamp 200. According to one embodiment of present invention, through proper pairing of sitting arrangement 310 and 320 among the rotary clamp 200, the EFA unit 103, and the splicing machine 104, axis orientation alignment of fibers pre-arranged and achieved at the EFA unit 103 may be properly maintained and transferred onto the splicing machine 104 for the splicing of the fibers.

It shall be noted here that feature structure pairs 311/312, 312/322, 313/323, 314/324, 315/325, 316/326, and 317/327 may be some sample examples of sitting arrangement and embodiment of present invention are not limited in this aspect. Other types of feature pairs may be used as well, as sitting arrangement among different components (i.e., the rotary clamp, the EFA unit, the splicing machine, and the fiber cutter) of the fiber splicing apparatus 100. Moreover, sitting arrangement 320, instead of 310, may be used at the bottom surface of the base member 210 of the rotary clamp 200 (or rotary clamp 101 in FIG. 1), and corresponding sitting arrangement 310 may be used at hosting surfaces of other components such as the EFA unit 103, the splicing machine 104, and optionally the fiber cutter 102.

Figure 4A:
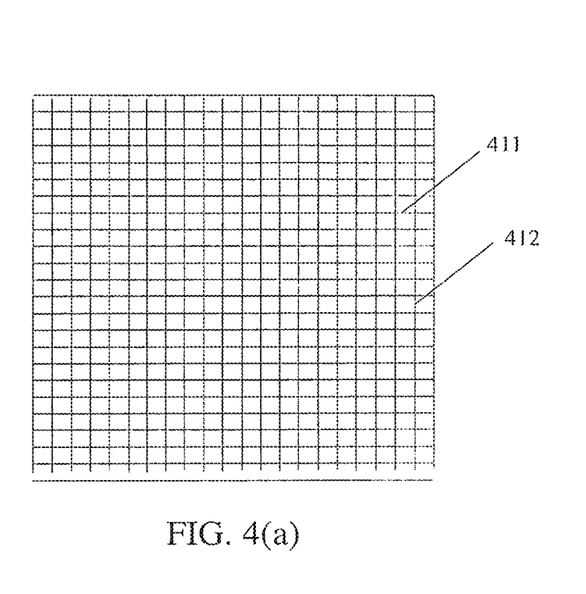
FIGS. 4(a) and 4(b) are demonstrative illustrations of some sample mesh-type grid lines used in an end-face alignment unit that is part of the fiber splicing apparatus or system illustrated in FIG. 1 according to some embodiment of present invention.
Figure 4B:
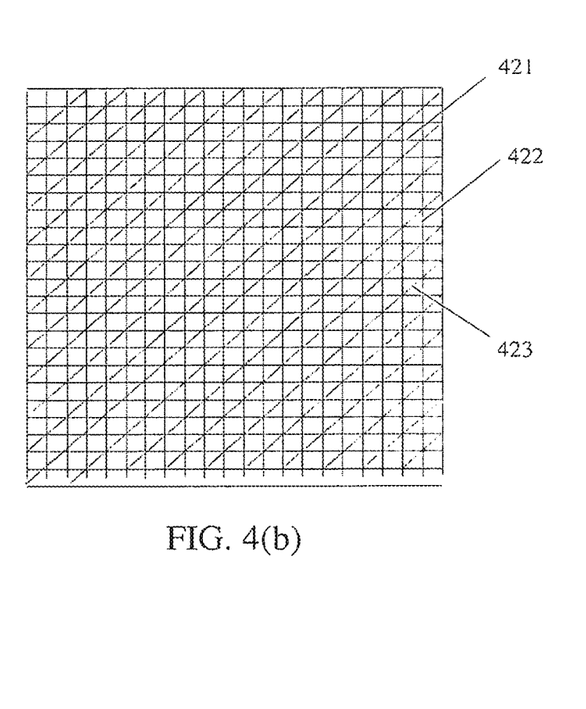
Figure 5A:
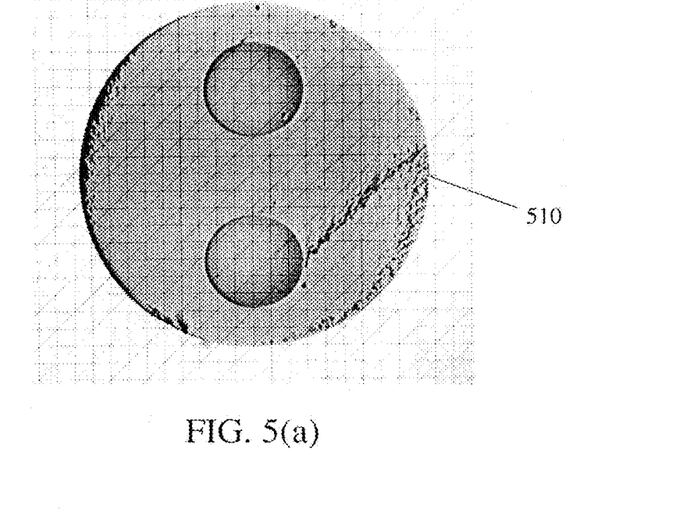
FIGS. 5(a), 5(b), 5(c), and 5(d) are some sample microscopic pictures of end-face axis orientation of fibers observed by the end-face alignment unit used in the fiber splicing apparatus or system illustrated in FIG. 1.
Figure 5B:
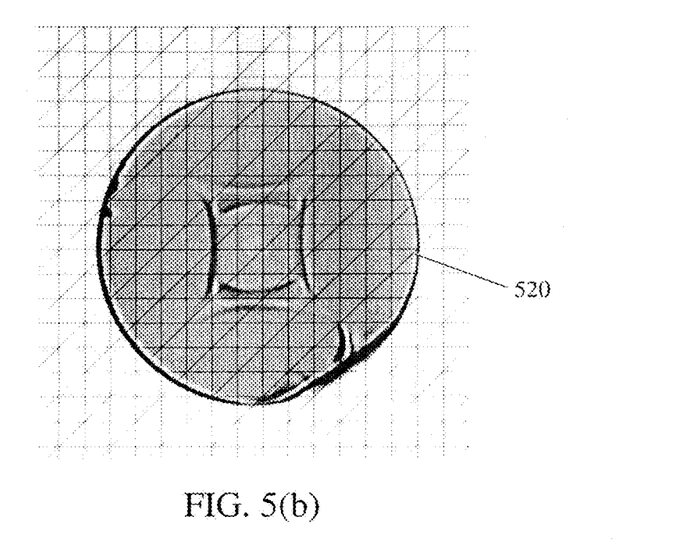
Figure 5C:
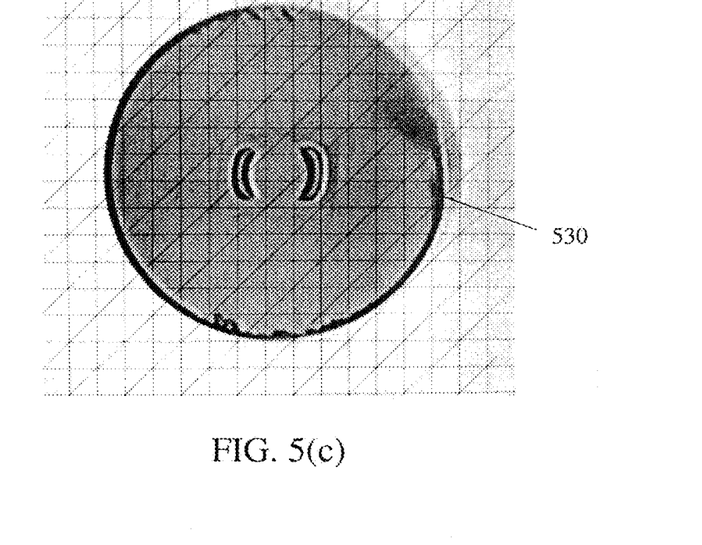
Figure 5D:
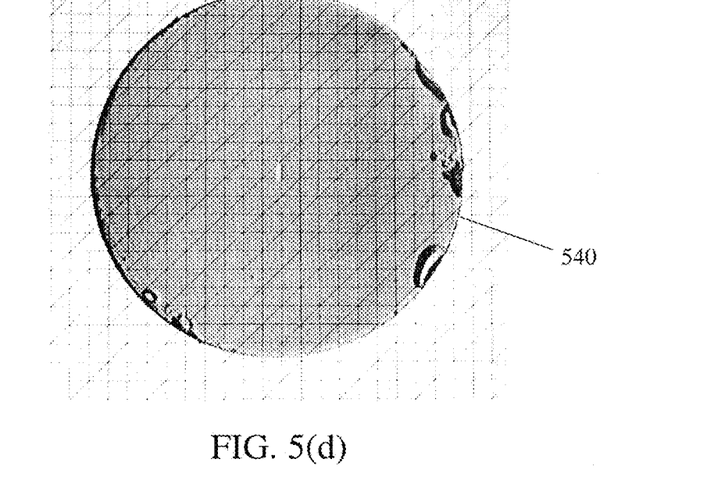

FIGS. 4(*a*) and 4(*b*) are demonstrative illustrations of some sample mesh-type grid lines used in an end-face alignment unit that is part of the fiber splicing system illustrated in FIG. 1 according to some embodiment of present invention. In one embodiment, the EFA unit 103 may be a high resolution microscope with a viewfinder 105 connected thereto. The viewfinder 105 may be, in one embodiment, a display screen. The high resolution microscope may have different mesh-type grid lines built-in as references, which may be user selectable and may be displayed on screen 105 to aid the axis orientation adjustment process of the fibers. For example, FIG. 4(*a*) illustrates one type of grid lines which includes two sets of orthogonal straight lines 411 and 412, horizontally and vertically respectively, with sufficiently fine spacing between the lines that is at least comparable to and preferably smaller than the core size of a typical fiber, whether the fiber is a regular fiber, a linear PM fiber, an elliptical PM fiber, or an elliptical core fiber. Further for example, FIG. 4(*b*) illustrates another type of grid lines which, in addition to the two sets of orthogonal straight lines 421 and 422 that are similar to those 411 and 412 in FIG. 4(*a*), may include one or two additional sets of lines such as lines 423 that are, for example, at 45 degrees intersecting the two sets of orthogonal straight reference lines 421 and 422. Any other types of grid lines that may provide assistance in the alignment of axis orientation of the fibers are fully contemplated herein according to embodiment of the present invention.

FIGS. 5(*a*), 5(*b*), 5(*c*), and 5(*d*) are some sample microscopic pictures of end-face axis orientation of fibers observed by the end-face alignment (EFA) unit 103 used in the fiber splicing apparatus or system illustrated in FIG. 1. For example, FIG. 5(*a*) shows an end-face picture of a Panda-type 125 um linear PM fiber 510; FIG. 5(*b*) shows an end-face picture of a bow-tie type 80 um elliptical PM fiber 520; FIG. 5(*c*) shows a "l"-shape 125 um linear PM fiber 530; and FIG. 5(*d*) shows a 125 um elliptical core linear PM fiber 540. With the help of built-in grid line references, whether horizontal, vertical, or in a 45 degree angle, it is easy to recognize and quantify the relative angular relationship between the axis orientation of the fiber core under adjustment and the grid lines. For example, the first rotary clamp 101 (or 200 in FIG. 2) that holds the first optical fiber may be mounted onto the EFA unit 103. Image of the end-face of the first optical fiber may be captured by the microscope of the EFA unit 103 and displayed on the display screen 105. A user may use the rotational knob 222 of rotary clamp 200 to adjust axis orientation of the first fiber while observing changes in the image displayed. Axis orientation of the first optical fiber may be aligned to one or more reference grid lines marked on the screen 105. For example, a vertical reference line may be chosen to align the axis orientation of the first optical fiber. The axis of the optical fiber may be aligned to the grid line to have, for example, an angular difference less than 0.5 degree.

Similarly, a second rotary clamp that holds a second optical fiber may be mounted onto the EFA unit 103 and end-face of the second optical fiber may be captured and displayed in display screen 105 and adjusted such that it has the same, for example vertical, orientation as that of the first optical fiber. In other words, the axis orientation of the second optical fiber may be aligned to the same vertical reference line as that used in the adjustment of the first optical fiber, with about the same accuracy of less than 0.5 degree. This may result in an overall accuracy of less than 1.0 degree when both rotary clamps are removed from the EFA unit 103 and mounted onto the splicing machine 104 through the precision control of the special sitting arrangement.

After axis orientation alignment, the first and second rotary clamps, with the first and second optical fibers being fixed to the clamping members 220 of the first and second rotary clamps 200 respectively and their axis orientation being locked by the locking mechanism 212, may be mounted onto the splicing machine 104. A special sitting arrangement, such as a pair of matching groove/ridge or other special physical features such as those demonstratively illustrated in FIGS. 3(*a*) and 3(*b*), between the base member 210 of the rotary clamps 200 and the splicing machine 104 may ensure proper alignment of the two base members 210 of the first and second rotary clamps 200 on the splicing machine 104 thereby substantially maintaining the condition of pre-aligned axis orientation between the first and second optical fibers. The splicing machine 104 may further bring end-faces of the two optical fibers closer together, through a step motor for example, and then initiate a splicing process. Although a fusion splicer is generally assumed, the splicing machine 104 may also be, for example, a mechanical splicer or any other types of suitable splicing machines. When the splicing machine is a fusion splicer, an electric arcing may be generated and applied to the end-faces of the two fibers causing them to be fused together.

Embodiment of present invention provides a method of performing splicing of two optical fibers with high efficiency and ease of operation, regardless whether the optical fibers to be spliced are regular fibers, linear PM fiber, elliptical PM fibers, other specialty fibers, or a mix of different types of fibers. As a non-limiting example, the method may be performed using the fiber splicing apparatus or system 100 demonstratively illustrated in FIG. 1 and described above in detail. However, embodiment of present invention are not limited in this aspect and other fiber splicing systems and/or apparatus may be used in performing the method described here.

Referencing to the fiber splicing apparatus 100, and its various components including rotary clamp 101, fiber cutter 102, end-face alignment unit 103 with viewfinder 105, and splicing machine 104, in the below description of method 600 is strictly for the explanation and understanding of the method, and shall not be considered in any way as being limited to and only applicable to the referenced apparatus.

Figure 6:
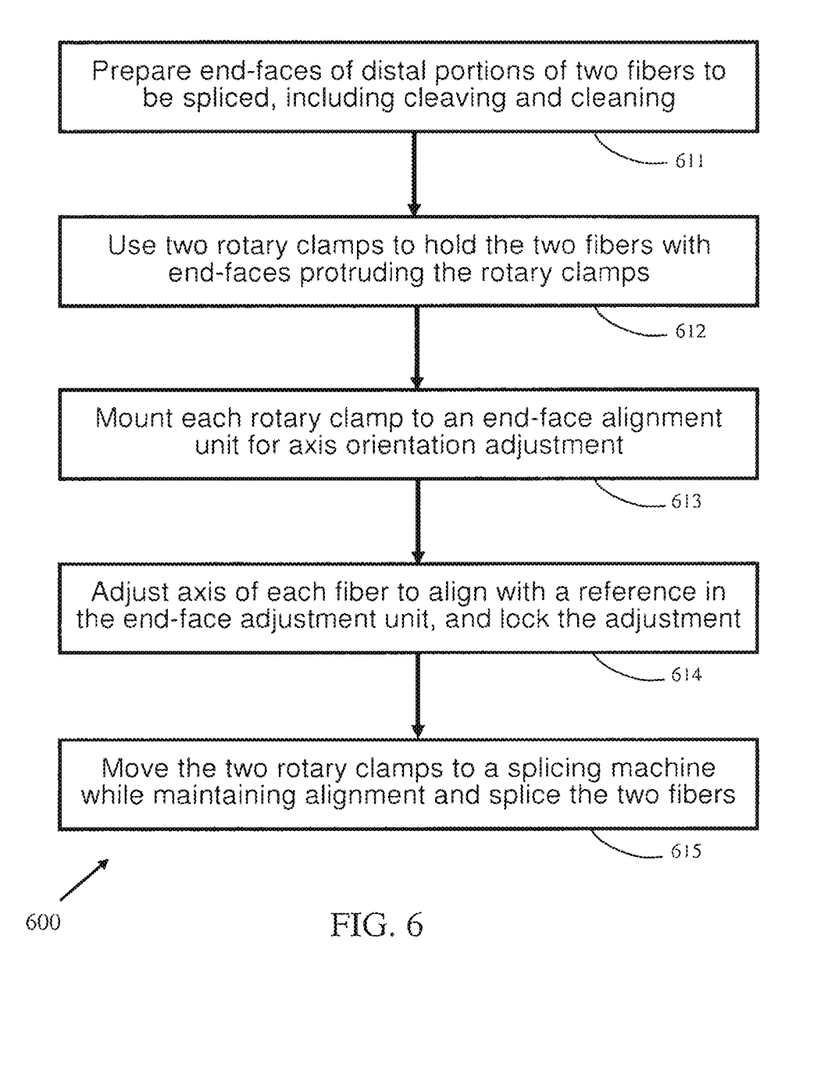
FIG. 6 is a simplified flow chart illustration of a method of performing fiber splicing according to an embodiment of present invention.

According to one embodiment, the method may be outlined in a simplified flow chart in FIG. 6. Specifically, as demonstrated in FIG. 6, a method 600 may include a step 611 of preparing end-faces at distal portions of two optical fibers that are to be spliced together. The preparation may include cutting the fibers to create their respective end-faces and performing cleaning of the end-faces to remove any residual fiber material, dirt, and/or possible oily element that may affect the quality of result of a subsequent splicing process. Optionally the cutting and/or cleaning step(s) may be performed at a later stage after the two optical fibers are first mounted onto two separate rotary clamps known as fiber clamping means or holding members.

In a next step 612, the method 600 may include placing the two optical fibers onto two rotary clamps respectively. Specifically, the method may include placing each optical fiber into a fiber-holding channel (223) made in a clamping member (220) through a guiding groove or slit (211) made in a base member (210) of a rotary clamp (200) and using a pressing sheet (221) of the clamping member (220) to hold tight of the fiber with an end portion thereof protruding the rotary clamp (200). If the fibers have not been cut at this stage, the two fibers may be cut using a fiber cutter (102). Additionally, if needed, end-faces of the two optical fibers exposed through the cutting may be pre-cleaned by mounting the two rotary clamps (200) onto a splicing machine (104) and using a pre-cleaning feature of the splicing machine (104) to apply an electric arcing to the end-faces of the two fibers to remove residual fiber materials left by the cutting, and other dirt and/or possible oily element.

Next, the method includes adjusting axis orientation of the two fibers such that they automatically align with each other later when being mounted onto the splicing machine. For example, at a next step 613 the method may include, with the optical fibers being held tight by the pressing sheet (221) of the rotary clamps (200), mounting each of the two rotary clamps (200) onto an end-face alignment (EFA) unit (103) for axis orientation adjustment. The EFA unit (103) may include, for example, a microscope and a viewfinder (105) connected thereto and the viewfinder (105) may be, in one embodiment, a display screen. The EFA unit (103) may have special sitting arrangement (310 or 320) with the rotary clamps, such as a pair of matching groove/ridge, pairs of magnets, or other physical feature structures, and be able to capture and display images of end-faces of the fibers that are being rotationally adjusted.

At a next step 614, axis orientation of the fibers may be rotated for example by using any rotational mechanism (222), such as a rotational knob, of the clamping member (220) of the rotary clamp (200) until the axis aligns with one or more pre-selected reference grid lines (411-412, 421-423) that are co-displayed on a screen of the viewfinder (105). This reference may be used as a common reference to be used in the alignment adjustment of the second fiber held by a second rotary clamp later. Once the axis orientation of the fiber has been aligned with the common reference, the rotational movement of the clamping member (220) may be locked by a locking mechanism (212) of the base member (210) of the rotary clamp (200) such that the axis orientation of the fiber is fixed relative to the base member (210) of the rotary clamp (200). Similarly, axis orientation of the second fiber may be aligned and subsequently locked.

Once axis orientation of the first and second fiber have been aligned using the EFA unit (103), the method may include a next step 615 of moving the two rotary clamps (200) onto a splicing machine (104) and splicing the two pre-aligned optical fibers together using the splicing function of the machine. The splicing machine (104) and the base member (210) of each of the rotary clamps (200) may have a special sitting arrangement, such as matching grooves/ridges or feature structures demonstratively illustrated in FIGS. 3(a) and 3(b), so that once the two rotary clamps (200) are mounted onto the splicing machine (104), relative axis orientation of the two fibers held by their respective rotary clamps (200) are substantially maintained, to an accuracy less than 1.0 angular degree difference, which is generally determined by the adjustment made at the EFA unit (103). With the two end-faces of the two fibers being substantially aligned, a high quality and low insertion loss splicing maybe achieved through, for example, a fusion splicing process provided by the splicing machine (104).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method of splicing fibers comprising:
   holding a first and a second fiber respectively by a first and a second rotary clamp;
   aligning an optical axis of the first fiber to an optical axis of the second fiber through a common reference;
   moving the first and second fibers that are held by the first and second rotary clamps onto a splicing machine while maintaining the optical axes orientation alignment between the first and second fibers; and
   causing the first and second fibers being spliced together by the splicing machine.

2. The method of claim 1, wherein each of the first and second rotary clamps has a base member and a clamping member that is rotationally adjustable relative to the base member and the first and second fibers are held by the clamping members of the first and second rotary clamps respectively.

3. The claim of claim 2, wherein aligning the optical axis of the first fiber to the optical axis of the second fiber comprises:

adjusting optical axes orientations of the first and second fibers to align with the common reference by rotating the clamping members of the first and second rotary clamps respectively; and locking the adjustment through a locking mechanism of the base member.

4. The method of claim 2, wherein aligning the optical axis of the first fiber to the optical axis of the second fiber comprises:

displaying an end-face of the first and second fibers under a microscope; and rotating the optical axes of the first and second fibers until they align with the common reference which is co-displayed with the end-face of the first and second fibers in a viewfinder of the microscope.

5. The method of claim 2, wherein moving the first and second fibers comprises applying a special sitting arrangement between the rotary clamps and the splicing machine to maintain optical axes orientation relationship between the first and second fibers.

6. The method of claim 1, further comprising preparing an end-face of the first and second fibers through cleaving and arcing cleaning.

7. A method of splicing fibers comprising:

holding a first and a second fiber respectively by a first and a second rotary clamp;

aligning an optical axis of the first fiber to a common reference of an end-face alignment unit;

aligning an optical axis of the second fiber to the common reference of the end-face alignment unit;

subsequently moving the first and second fibers, being held by the first and second rotary clamps, onto a splicing machine, wherein the optical axis of the first fiber is aligned to the optical axis of the second fiber by virtue of their respective alignment to the common reference; and causing the first and second fibers being spliced together by the splicing machine.

8. The method of claim 7, wherein each of the first and second rotary clamps has a base member and a clamping member that is rotationally adjustable relative to the base member and the first and second fibers are held by the clamping members of the first and second rotary clamps respectively.

9. The claim of claim 7, wherein aligning the optical axis of the first fiber to the common reference of the end-face alignment unit comprises:

adjusting optical axis orientation of the first fiber to align with the common reference of the end-face alignment unit by rotating the clamping member of the first rotary clamp; and locking the adjustment through a locking mechanism of the base member of the first rotary clamp.

10. The method of claim 7, wherein aligning the optical axis of the first fiber to the common reference of the end-fact alignment unit comprises:

displaying an end-face of the first fiber in a viewfinder of a microscope;

co-displaying the common reference of the end-face alignment unit in the viewfinder; and rotating the clamping member of the first rotary clamp to adjust the optical axis of the first fiber until it aligns with the common reference.

11. The method of claim 7, wherein moving the first and second fibers comprises applying a special sitting arrangement between the rotary clamps and the splicing machine to maintain orientation relationship of the optical axes of the first and second fibers.

12. The method of claim 7, further comprising preparing an end-face of the first and second fibers through cleaving and arcing cleaning.

13. A method of splicing fibers comprising:

holding a first and a second fiber respectively by a first and a second rotary clamp;

aligning an optical axis of the first fiber to an optical axis of the second fiber through adjusting the first and second rotary clamps;

after aligning the optical axes, moving the first and second fibers held by the first and second rotary clamps onto a splicing machine while maintaining the optical axes orientation alignment between the first and second fibers; and causing the first and second fibers being spliced together by the splicing machine.

14. The method of claim 13, wherein each of the first and second rotary clamps has a base member and a clamping member that is rotationally adjustable relative to the base member and the first and second fibers are held by the clamping members of the first and second rotary clamps respectively.

15. The claim of claim 14, wherein aligning the optical axis of the first fiber to the optical axis of the second fiber comprises:

adjusting optical axes orientations of the first and second fibers to align with a common reference by rotating the clamping members of the first and second rotary clamps respectively; and locking the adjustment through a locking mechanism of the base member.

16. The method of claim 14, wherein aligning the optical axis of the first fiber to the optical axis of the second fiber comprises:

displaying an end-face of the first fiber in a viewfinder of a microscope;

rotating the optical axis of the first fiber until it aligns with a common reference co-displayed in the viewfinder;

displaying an end-face of the second fiber in the viewfinder of the microscope; and rotating the optical axis of the second fiber until it aligns with a common reference co-displayed in the viewfinder.

17. The method of claim 16, wherein the common reference is a set of mesh-type grid lines of an end-face alignment unit.

18. The method of claim 17, further comprising aligning the optical axes of the first and second fibers to the common reference by mounting the first and second rotary clamps, respectively, onto the end-face alignment unit and performing alignment through the end-face alignment unit.

19. The method of claim 14, wherein moving the first and second fibers comprises moving the first and second fibers onto a sitting arrangement of the splicing machine, wherein the sitting arrangement causes orientation relationship of optical axes between the first and second fibers held by the first and second rotary clamps being maintained.

20. The method of claim 13, further comprising preparing an end-face of the first and second fibers through cleaving and arcing cleaning.

* * * * *